June 23, 1936.  G. G. KISEVALTER  2,044,794
WIND MOTOR
Filed Aug. 3, 1934   2 Sheets-Sheet 2
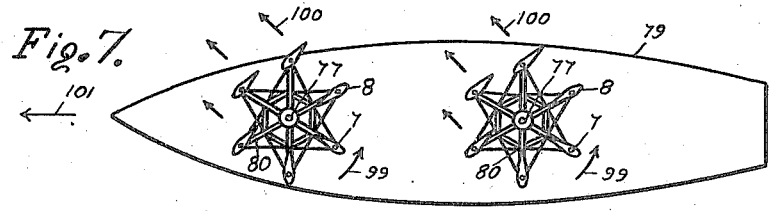
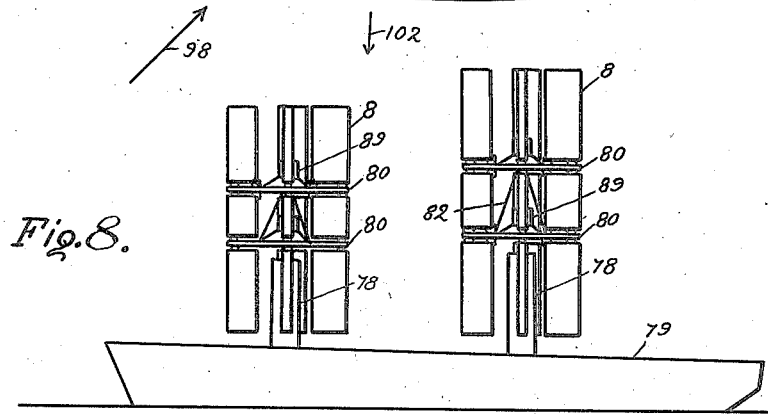
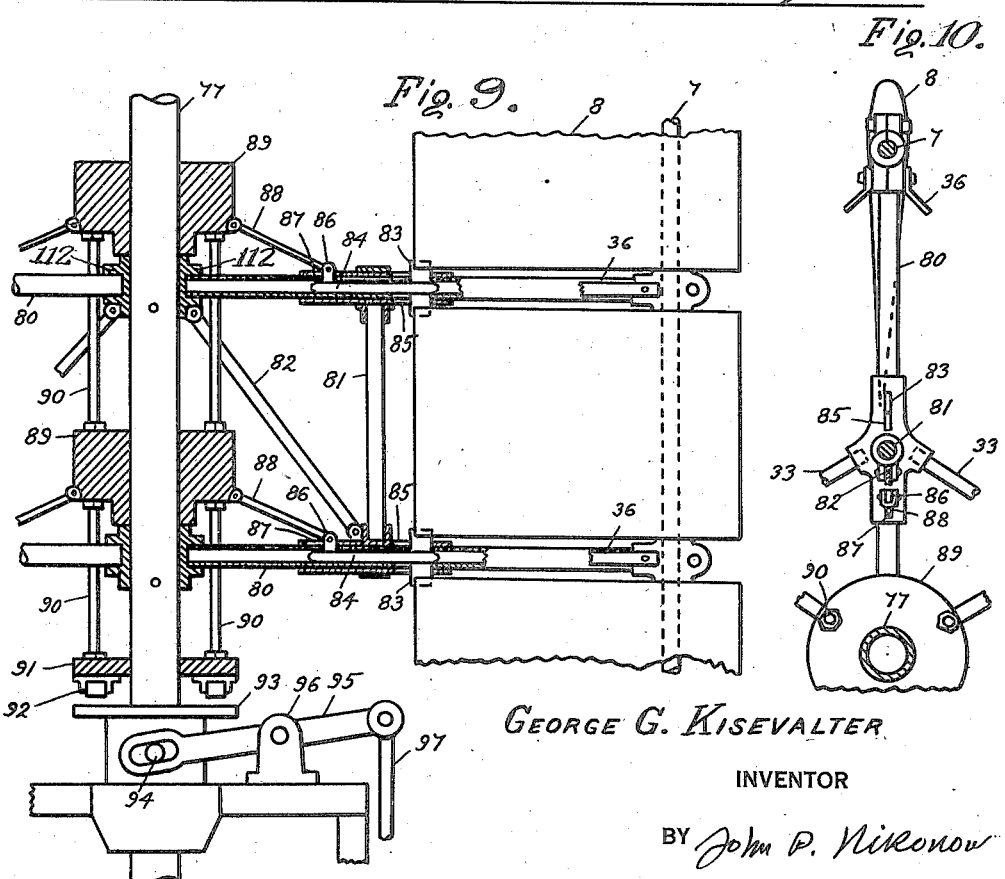
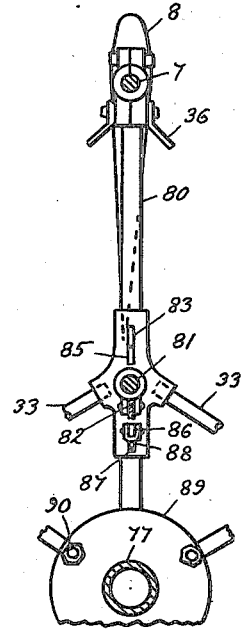
GEORGE G. KISEVALTER
INVENTOR
BY John P. Nikonow
ATTORNEY Patented June 23, 1936

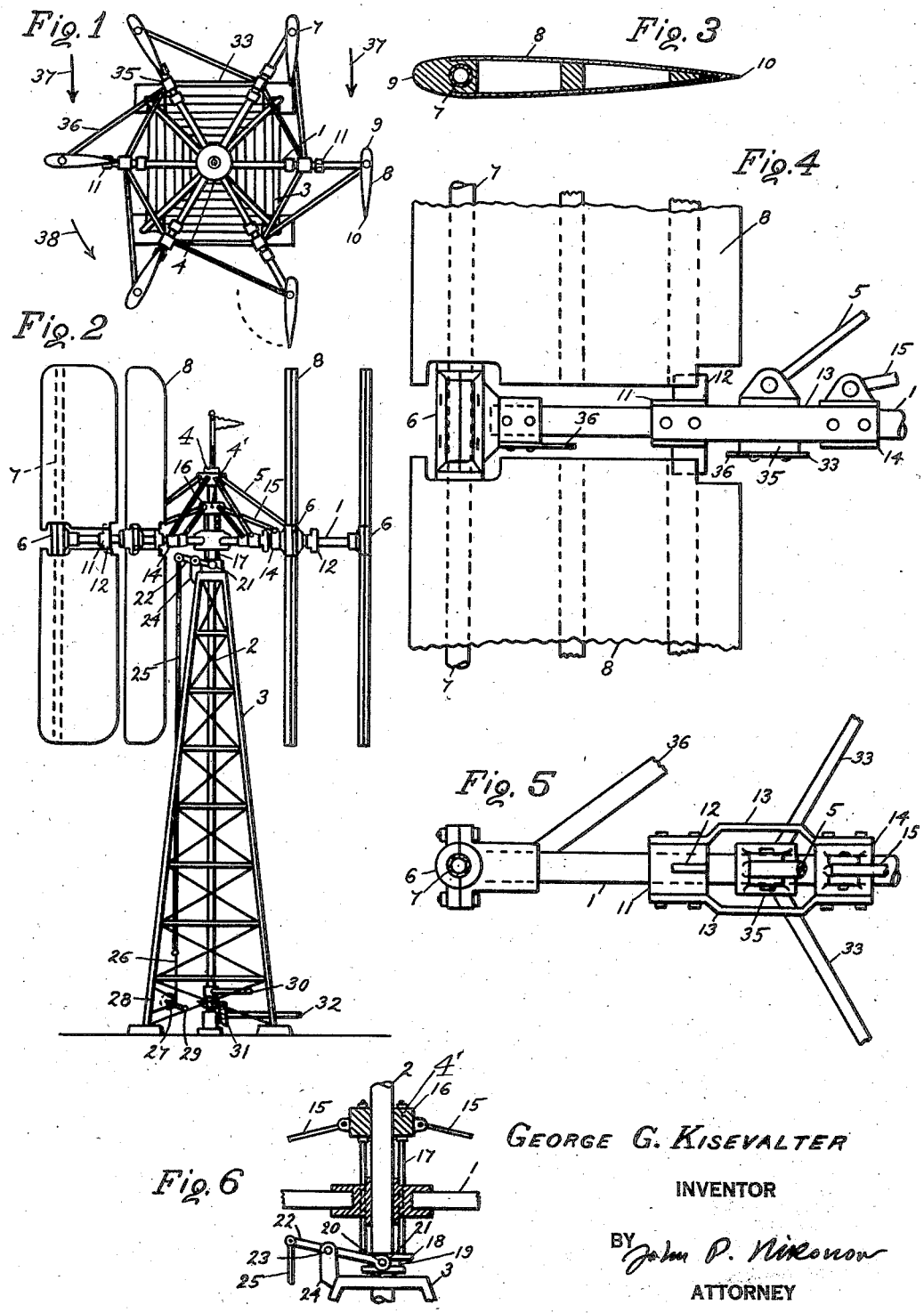

2,044,794

UNITED STATES PATENT OFFICE 2,044,794

WIND MOTOR

George G. Kisevalter, New York, N. Y.

Application August 3, 1934, Serial No. 738,281

3 Claims. (Cl. 170—26)

My invention relates to wind motors and has particular reference to wind motors or windmills having pivoted vanes.

My invention has for an object to provide a wind motor which will operate with wind blowing in any direction, without any adjustment in the position of the wheel.

Another object of my invention is to provide a wind motor which can be controlled from the ground so as to release all the vanes thereby rendering the motor inoperative, or to start the motor again by limiting the movement of the vanes.

Still another object of my invention is to provide means for changing the direction of rotation of the motor.

I accomplish these objects by providing a wind motor formed of vanes pivotally mounted on a spider, the vanes being adapted to turn in the plane of the spider. I also provide stops for the vanes on the spider arms so arranged, that the vanes on one side of the wheel are held against the stops being turned against the wind by their sides, the vanes on the other side of the wheel swinging free from the stops and therefore facing the wind edgewise. The difference in the air pressure on the two sides of the wheel will cause its rotation.

I also provide means for withdrawing the stops thereby releasing all the vanes and stopping the wheel. In order to restart the wheel, it must be given a fraction of a turn in the desired direction, then placing the stops in the operative position.

My wind motor can be operated by any flowing fluid, and when built of proper materials, can be used as a water motor operated by the flow of water in a river or in the ocean.

My wind motor, properly constructed, can be used on airplanes in place of wings, or as a motor for turning cylindrical rotors.

These and other objects of my invention will be apparent from the accompanying description and specification, being also fully disclosed in the accompanying drawings in which—

Fig. 1 is a view showing transverse section of my motor, Fig. 2 is an elevation of the same, Fig. 3 is a sectional view of the motor vane, Fig. 4 is a detail view of the vane mounting, Fig. 5 is a detail view of the vane mounting in another projection, Fig. 6 is a detail view of the stop operating mechanism, Fig. 7 is a plan view of a ship provided with my wind motors, Fig. 8 is an elevation of the same, Fig. 9 is a detail view of a modified construction of the vane mounting and stop operating mechanism, and Fig. 10 is a detail view of the same taken in another projection.

My wind motor consists of a spider having arms 1 extending radially from a hub 4'. The hub 4' is mounted on a vertical shaft 2 rotatively supported in a tower 3. The shaft extends upward beyond the spider and has a hub 4 with inclined rods 5 supporting the spider arms at their middle points.

The spider arms have split bearings 6 at the ends for rods 7 on which vanes 8 are mounted. The rods with their vanes can turn freely in the bearings 6. The vanes have blunt forward edges 9 and sharp tails 10, having generally streamlined section so as to offer the least resistance to the air flow when facing the wind edgewise. The rods 7 are placed nearer the blunt end so as to cause the tail end to swing with the wind.

Sliding blocks 11 are mounted on the arms of the spider near the inner or tail edges of the vanes. The blocks are provided with lugs or stops 12 against which the tail ends of the vanes come to rest. The blocks 11 are connected by bars 13 with inner sliding blocks 14 with pivotally connected rods 15. The other ends of the rods 15 are pivotally connected to a heavy cylinder 16 slidably mounted on the shaft 2. Rods 17 extend from the cylinder 16 to a sliding collar 18 with a groove 19 engaged by pins 20 on a fork 21 on the end of a lever 22 mounted on a pin 23 on a bracket 24 supported on the tower 3. A rod 25 is connected with the other end of the lever and is connected with a cable 26 wound on a drum 27 supported in a bracket 28 mounted on one of the tower legs. A handle 29 is provided for turning the drum 27. A handle 30 is fastened to the lower end of the shaft 2 for turning it when it is desired to start the motor. The handle may be provided with a ratchet mechanism of an ordinary construction if it is desired to keep the handle from turning when the motor is in operation. Bevel gears 31 or a similar transmission may be provided for transmitting the power to a horizontal shaft 32.

The blunt edges of the vanes may be made solid and heavy, while the tail ends may be hollow and light, in order to balance the action of the centrifugal force on the tail ends.

The spider arms are stiffened by braces 33 attached to stationary blocks 35 to which the ends of the rods 5 are secured. Additional angular braces 36 are provided for holding the ends of the spider arms. The inner ends of these braces are attached to the blocks 35, and the outer ends to the bearings 6. All these braces are located in the plane of the spider and do not interfere with the rotation of the vanes.

The operation of my wind motor is as follows. With the wind blowing in direction of arrows 37, Fig. 1, the vanes on the left side of the wheel will be pressed by the force of the wind against the lugs or stops 12, being thereby prevented from rotation. The air pressure on these vanes will turn the wheel in direction of an arrow 38. As soon as a vane passes from the left to the right side of the wheel, the other side of the vane will be subjected to the air pressure, pushing the vane away from the spider arm. The vane will swing around as shown with dotted lines in Fig. 1, taking position in line with the direction of wind, thereby offering the least resistance to the air flow. All the vanes on the right side of the wheel will be aligned in direction of the air flow. In order to reduce their air resistance to a minimum, the vanes are given a streamlined section, with blunt forward ends and sharp tapering tails. Difference in the air pressure on the left and right sides of the wheel will provide the force for turning the wheel and producing a useful work through the shafts 2 or 32. The total amount of rotation of each vane is somewhat less than 180° of a circle. Direction of the wind determines which side is right and which is left, the wheel itself being perfectly symmetrical and adapted to operate equally well with the wind blowing in any direction.

The stops 12 are held in their operative position by the weight of the cylinder 16 pushing on the blocks 14 by the rods 15. If it is desired to stop the wheel, then the handle 29 is turned, winding the cable 26 and pulling down the end of the lever 22. The collar 18 will be then raised together with the cylinder 16, the latter pulling on the rods 15 and moving the stops 12 away from the vanes. All the vanes will be now free to swing with the wind. The air pressure will be equalized on both sides and reduced to a minimum. As a result, the wheel will stop.

In order to start the wheel, it is given a fraction of a turn by the handle 30 until the vanes begin to pass from the right to the left side of the wheel, when they will be caught by the wind and, being locked by the stops 12, will be gradually turned with their planes to the wind. The rotation again is assumed to be in direction of the arrow 38. It is evident, however, that the wheel can be made to rotate in the opposite direction by giving it a corresponding starting turn by the handle 30.

Another modification is shown in Figs. 7 to 8 inclusive. Here my wind motors are mounted on shafts 77 rotatively supported in masts 78 on a ship 79. The wheels are formed of vanes 8 on rods 7 rotatively supported on tubular arms 80 attached to hubs 112 and forming spiders. Two such spiders are mounted on each shaft 77 and are connected together by vertical posts 81 and diagonal braces 82. Vane holding stops or lugs 83 are attached to rods 84 sliding inside of the tubular arms of the spiders. Slots 85 are provided for the lugs 83. The other ends of the rods 84 are provided with lugs 86 passing through slots 87 and connected by links 88 with heavy cylinders 89 sliding on the shafts 77. Rods 90 connect the cylinders with a plate 91 provided with rollers 92 underneath engaging the upper surface of a collar 93. The latter has trunnions 94 passing through slots in levers 95 mounted on brackets 96 and provided with rods 97 extending to the control room on the deck of the ship. By pulling on the rod 97 the cylinders 89 are raised pulling out the rods 84 with the stops 83 and releasing the vanes. The wheels are started again by lowering the cylinders 89 and giving the shafts 77 a fraction of a turn in the desired direction.

The actual sailing conditions are illustrated in Fig. 7. With the wind blowing in direction of an arrow 98 and with the wheels set for rotation in direction of arrows 99, there will be a tractive force in direction of arrows 100 caused by the suction on the convex outer sides of the vanes 8. The ship may be than propelled in any corresponding direction as shown by an arrow 101, as determined by the position of its rudder. The ship may be thrown into another tack for propelling it against the wind, by reversing the rotation of the wind motors. For this purpose the forward wheel is released at first by pulling out the stops 83. Then it is given a fraction of a turn in another direction bringing at the same time the stops back into their operative positions. The ship will rapidly swing around, and then the second wheel is reversed in its rotation. The ship will then proceed in direction of an arrow 102.

I claim as my invention:

1. In a device of the class described, the combination of a spider rotatively mounted on a shaft, rods journaled by their middle points on the ends of the arms of said spider, vanes attached to said rods on either sides of said arms, and movable blocks on said arms adapted to prevent the rotation of said vanes over said arms.

2. In a device of the class described, the combination of a spider rotatively mounted on a shaft, bearings on the ends of the arms of said spider parallel to said shaft, rods journaled in said bearings by their middle portions, vanes mounted on said rods on either side of these bearings, angular braces extending from said arms beyond the reach of said vanes to said shaft, sliding blocks on said arms beyond said braces adapted to prevent the rotation of said vanes across said arms, a sliding member on said shaft, angular links connecting said member with said sliding block, and a manual means for moving said member thereby controlling the operative positions of said sliding blocks.

3. In a device of the class described, the combination of a spider mounted on a vertical shaft, bearings on the ends of the arms of said spider, rods journaled in said bearings by their middle portions in parallel alignment with said shaft, vanes mounted on the portions of said rods on either side of said bearings, angular braces extending from the middle portions of said arms to said shaft above said spider, blocks with lugs slidably mounted on said arms beyond said braces and adapted to prevent the rotation of said vanes across said arms, a heavy sliding member on said shaft above said spider, links extending from said member to said sliding blocks, and a manual means for raising said block thereby withdrawing said blocks from contact with said vanes.

GEORGE G. KISEVALTER.